US010165742B2

(12) United States Patent
Binder

(10) Patent No.: US 10,165,742 B2
(45) Date of Patent: Jan. 1, 2019

(54) CENTER PIVOT IRRIGATION SYSTEM

(71) Applicant: Mark Binder, Inman, KS (US)

(72) Inventor: Mark Binder, Inman, KS (US)

(*) Notice: Subject to any disclaimer, the term of this patent is extended or adjusted under 35 U.S.C. 154(b) by 57 days.

(21) Appl. No.: 15/268,230

(22) Filed: Sep. 16, 2016

(65) Prior Publication Data

US 2017/0000047 A1 Jan. 5, 2017

(51) Int. Cl.
*A01G 25/09* (2006.01)

(52) U.S. Cl.
CPC .................................. *A01G 25/092* (2013.01)

(58) Field of Classification Search
CPC ........ A01G 25/092; B05B 1/20; B05B 13/005
USPC ....... 239/728; 74/469; 280/298, 47.16, 47.2; 172/311
See application file for complete search history.

(56) References Cited

U.S. PATENT DOCUMENTS 2,726,895 A * 12/1955 Behlen .................. A01G 25/09 239/269
3,071,327 A 1/1963 Cornelius
3,230,969 A 1/1966 Puriell
3,281,081 A * 10/1966 Purtell .................. A01G 25/09 239/734
3,379,378 A * 4/1968 Kern ...................... A01G 25/09 239/733
3,526,364 A 9/1970 Hattis
3,618,859 A 11/1971 Watts
3,662,776 A * 5/1972 Bryant ................. A01G 25/092 239/728
3,684,180 A 8/1972 Gorzell
3,726,366 A 4/1973 Williams
3,866,835 A 2/1975 Dowd
3,878,860 A 4/1975 Pritchard
3,917,171 A 11/1975 Reinke
3,957,204 A 5/1976 Farris et al.
4,163,459 A 8/1979 Hegemann
4,164,323 A 8/1979 Ellison
4,191,206 A 3/1980 Baker
4,352,464 A 10/1982 Cornelius et al.
4,363,444 A * 12/1982 Dejoie ................ A01G 25/092 239/728

(Continued)

FOREIGN PATENT DOCUMENTS

EP 2489572 8/2012

*Primary Examiner* — Chee-Chong Lee
(74) *Attorney, Agent, or Firm* — Kenneth H. Jack; David & Jack, L.L.C.

(57) ABSTRACT

A center pivot irrigation system including a plurality of towers having circumferential and counter-circumferential legs; circumferential and counter-circumferential pivot arms having proximal ends respectively pivotally attached to the circumferential and counter-circumferential legs; circumferential and counter-circumferential linear motion actuators respectively triangulating between the circumferential pivot arms and circumferential legs, and between the counter-circumferential pivot arms and counter-circumferential legs, the linear motion actuators being adapted for alternatively upwardly retracting and downwardly extending the circumferential and counter-circumferential pivot arms; and circumferential and counter-circumferential ground contact assemblies which are adapted for, upon the circumferential and counter-circumferential pivot arms' downward extensions, downwardly biasing against a ground surface.

9 Claims, 3 Drawing Sheets

(56) References Cited

U.S. PATENT DOCUMENTS

| | | | | | |
|---|---|---|---|---|---|
| 4,445,643 | A | | 5/1984 | Thorsby et al. | |
| 4,452,398 | A | | 6/1984 | Wheaton et al. | |
| 4,601,347 | A | | 7/1986 | Parish | |
| 5,685,497 | A | * | 11/1997 | Cole | A01G 25/092 239/728 |
| 5,927,619 | A | | 7/1999 | Newbill | |
| 8,991,108 | B1 | | 3/2015 | Zamrzla | |
| 8,998,162 | B1 | | 4/2015 | Gutha et al. | |
| 9,149,012 | B1 | | 10/2015 | Sorensen | |
| 9,215,847 | B2 | | 12/2015 | Bainter | |
| 9,271,453 | B2 | | 3/2016 | Frager | |
| 2006/0225900 | A1 | * | 10/2006 | Kimball | A01B 73/044 172/311 |
| 2014/0219756 | A1 | * | 8/2014 | Smith | A61G 3/061 414/537 |
| 2014/0371971 | A1 | | 12/2014 | Welch | |
| 2015/0121770 | A1 | | 5/2015 | Korus | |

* cited by examiner 50
52
58
48
56
54
76
43
78
24
26
3
2
46
10
4
35
33
45
62
42
6
68
44
34
12
40
38
32
64
66
70
36
30
14
74
28
14
60
72
15
15
20
22
23
8
18

80
82
96
2
90
94
92
19
98
93

CENTER PIVOT IRRIGATION SYSTEM

FIELD OF THE INVENTION

This invention relates to agricultural center pivot irrigation systems. More particularly, this invention relates to special adaptations of such systems for prevention of toppling of components during high winds.

BACKGROUND OF THE INVENTION

Center pivot irrigation systems commonly comprise a central pivot tower or pedestal which incorporates and supports a vertically extending irrigation water supply pipe segment. The lower input end of such pipe segment typically receives water from a buried pipe which extends to a water wellhead or other pressurized water source.

The upper end of such vertical water pipe segment communicates with an inner end of a radially extending overhead pipe, such communication typically comprising a water sealed swivel joint. Such overhead pipe is typically supported above the field by a radially extending series of rolling "A" frame towers, each of such towers carrying its own motor which is mounted for rotatably driving its wheels. Actuation and operation of the towers' motor driven wheels moves the overhead pipe in a rotating or orbiting fashion about the irrigator's central pivot. Sprinkler outlets are typically attached to the overhead pipe in an evenly spaced series along its radial length so that the orbiting motion of the "A" frame towers and of the overhead pipe effectively waters and irrigates a large circular area of agricultural cropland.

Such center pivot irrigation systems tend to undesirably topple or overturn in high winds causing expensive and difficultly repaired damage. The instant inventive center pivot irrigation system provides a solution to such problem of wind toppling of irrigation towers and pipes by providing and associating with the system's radial series of "A" frame towers paired ground contacting pivot arms which function as stabilizing outriggers, and which are actuated for raising and lowering by triangulating linear motion actuators.

BRIEF SUMMARY OF THE INVENTION

The instant inventive center pivot irrigation system conventionally incorporates a plurality of rolling "A" frame towers, each tower having a circumferentially extending leg and a counter-circumferentially extending leg. Such towers are conventionally arrayed in a series extending radially from a central pivot water supply point, such towers supporting an overhead water supply pipe. The instant invention preferably attaches a plurality of paired circumferential and counter-circumferential pivot arms respectively to the towers' circumferential and counter-circumferential legs. In a preferred embodiment, proximal ends of such circumferential and counter-circumferential pivot arms attach to such tower legs by means of pivoting clevis joints.

Circumferential and counter-circumferential linear motion actuators are preferably pivotally mounted upon the towers' circumferential and counter-circumferential legs, such actuators respectively extending in triangulating fashions to engage the pluralities of circumferential and counter-circumferential pivot arms. Actuation and counter-actuation of the circumferential and counter-circumferential linear motion actuators alternatively extends and retracts the pivot arms. The extension motions of the pivot arms preferably move the pivot arms downwardly toward the ground while the retracting motions of the pivot arms oppositely compactly raise the pivot arms. In a preferred embodiment, the circumferential and counter-circumferential linear motion actuators comprise electric motor driven jack screw actuators. Alternatively, such actuators may suitably comprise electric motor driven ball screw actuators. Hydraulic or pneumatic cylinder actuators may also be suitably substituted. Electric motor driven rack and pinion gear actuators may also be suitably substituted. Winch actuators may also be suitably substituted.

In order to provide effective stabilizing engagements of the pluralities of circumferential and counter-circumferential pivot arms with the ground, pluralities of circumferential and counter-circumferential ground contact assemblies are preferably provided, such assemblies respectively being fixedly attached to distal ends of the circumferential and counter-circumferential pivot arms. Such ground contact assemblies preferably comprise circumferential and counter-circumferential ground contacting members. In a preferred embodiment, the invention's ground contacting members comprise wheels which work consonantly with continuous wheel driven motion of the towers. Suitably, the ground contact members may alternatively comprise slides or skids.

In a preferred embodiment, the invention's circumferential and counter-circumferential ground contact assemblies further comprise pluralities of circumferential and counter-circumferential extension arms, such arms having proximal ends which are respectively pivotally attached to the distal ends of the circumferential and counter-circumferential pivot arms. Where the ground contact members comprise wheels, as is preferred, the wheels are preferably rotatably mounted at distal ends of the circumferential and counter-circumferential extension arms.

Where the invention's ground contact assemblies comprise circumferential and counter-circumferential extension arms, as is preferred, such arms are preferably adapted to compactly inwardly fold toward the irrigator's "A" towers upon retractions of the circumferential and counter-circumferential pivot arms, and such arms are correspondingly adapted to simultaneously outwardly extend in the directions of the pivot arms' extensions. To actuate such simultaneous inward and outward extension arm motions, pluralities of circumferential and counter-circumferential parallel bar linkages are preferably provided. Such linkages preferably alternatively actuate the inward foldings of the extension arms upon retractions of the circumferential and oppositely circumferential pivot arms, and oppositely actuate the outward extensions of such arms.

In operation of the instant inventive center pivot irrigation system, and assuming that electric motor driven linear motion actuators are supplied, such actuators may be powered by the same electrical power source which powers electric motors which drive the "A" towers' wheels. Electrically switched actuations and de-actuations of the invention's linear motion actuators are preferably controlled via a micro-processor which is capable of receiving and processing wind speed information from such anemometer or other electronic telemetry. While the wind speed signal from such anemometer to such processor remains at a non-threatening level less than 55 mph, the processor may actuate the linear motion actuators to compactly retract the invention's circumferential and counter-circumferential pivot arms. In the event that wind speed detected by the anemometer exceeds the 55 mph threat level, the processor may actuate the linear motion actuators to extend the circumferential and counter-circumferential pivot arms, and to cause the invention's ground contact member wheels to bias against the ground.

Such ground contacts beneficially stabilize the system's "A" frame towers in the manner of outriggers, preventing the wind from toppling the "A" frame towers.

Accordingly, objects of the instant invention include the provision of a center pivot irrigation system which incorporates structures as described above, and which arranges those structures in relation to each other in manners described above, for the performance of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 3:
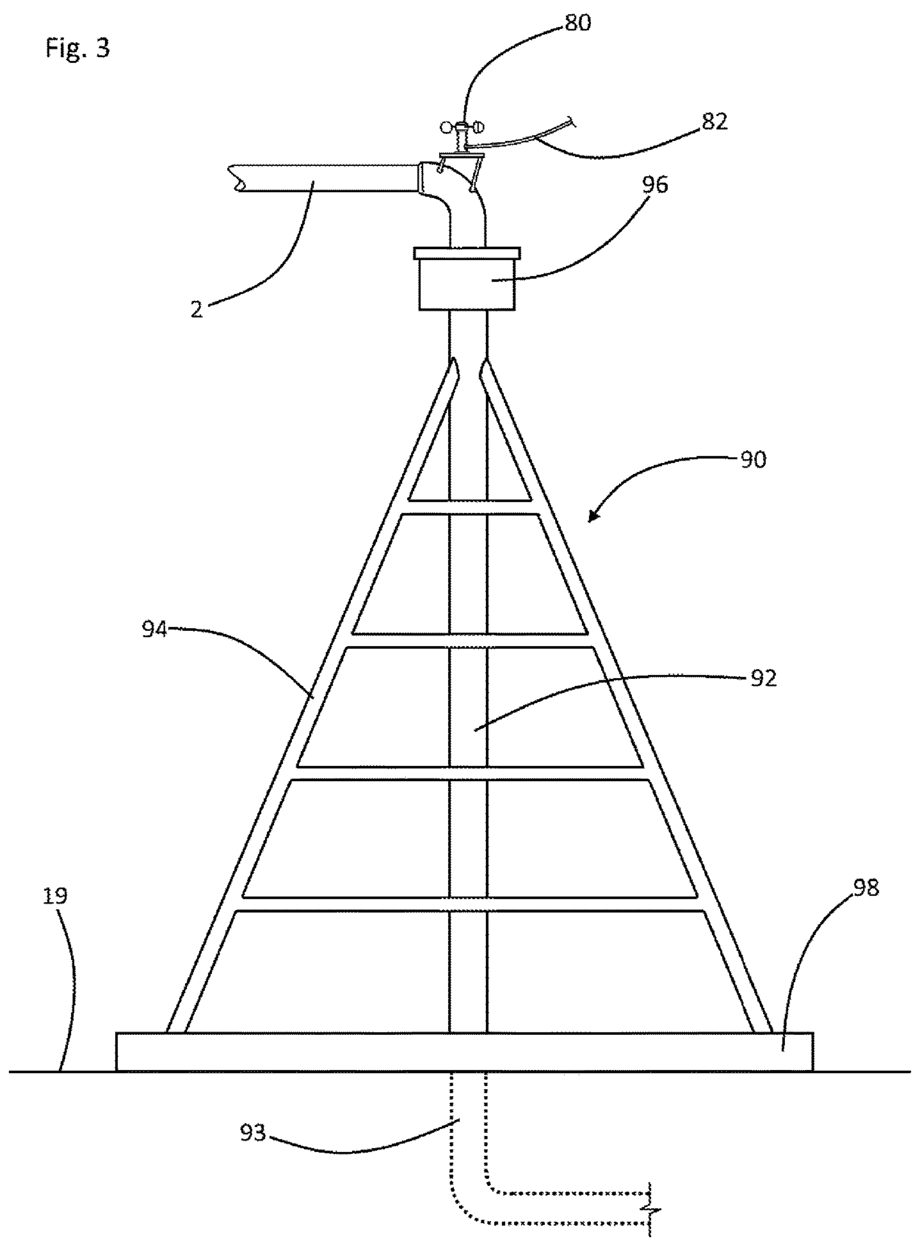
FIG. 3 is a side view of a center pivot tower component of the instant inventive assembly.

Referring now to the drawings and in particular to Drawing FIG. 3, the instant inventive center pivot irrigation system preferably comprises a center pivot tower or pedestal 90 which includes a pyramidal support frame structure 94 mounted upon a base or foundation slab 98. Portable versions of the instant invention system may provide a wheeled chassis frame which supports the tower 94, and the slab 98 is considered to be representative of such wheeled chassis.

A vertically extending water supply pipe 92 has a ground extension 93 buried within the ground 19, such ground extension 93 extending to a irrigation water supply source such as the wellhead of an irrigation well (not depicted within views). The upper end of the vertical water supply pipe 92 communicates with a substantially horizontally and radially extending overhead water pipe 2, such pipe connecting with pipe 92 at a water sealed swivel joint 96. An anemometer 80 which emits pulsed wind speed data via electric cable 82 may be advantageously mounted as indicated, such anemometer correlating actuations of the wind damage protecting structures described below with an onset of high wind speeds.

Figure 1:
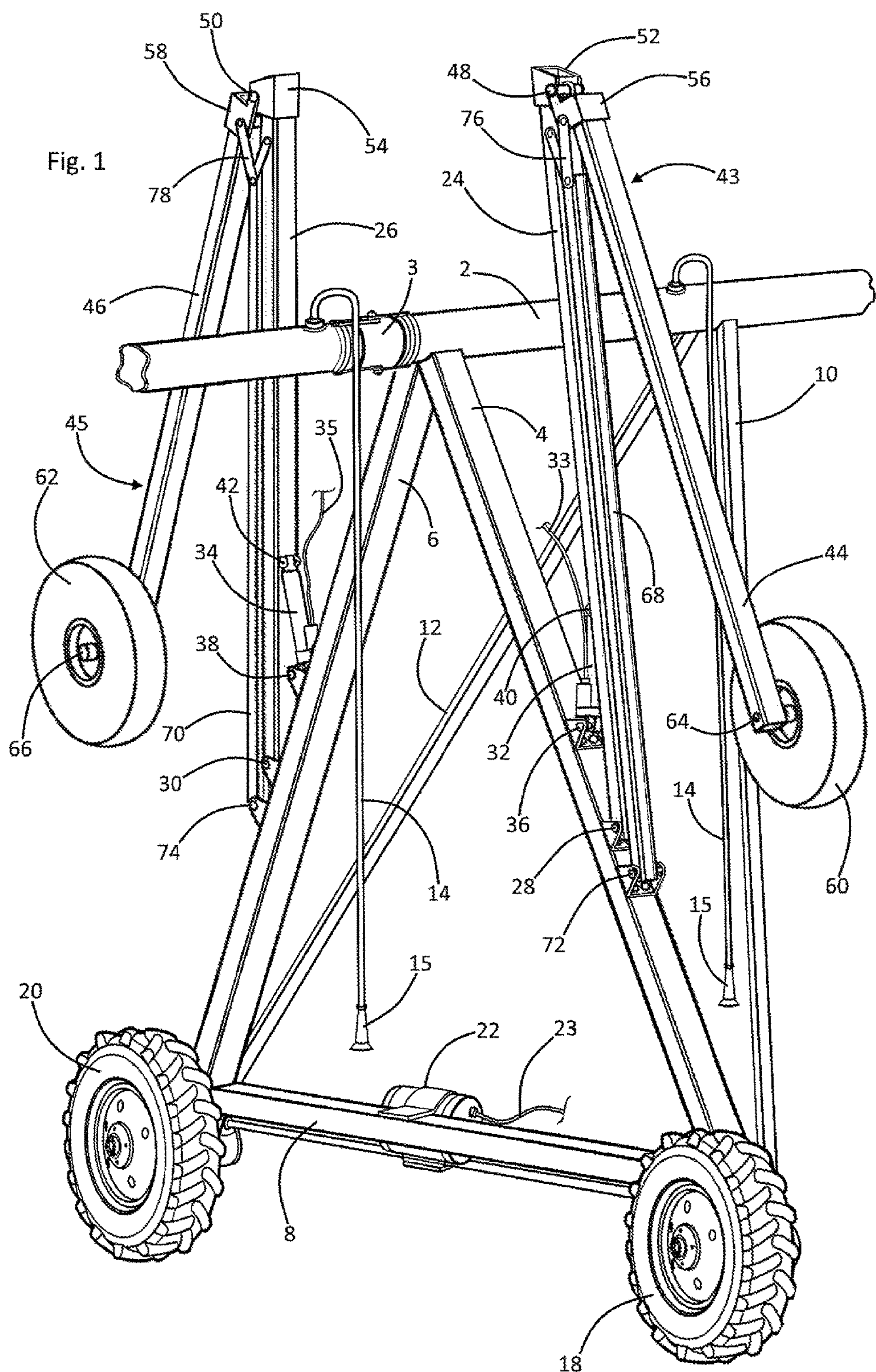
FIG. 1 is a perspective view of one of the "A" frame tower components of the instant inventive center pivot irrigation system.

The overhead pipe 2 may advantageously extend horizontally and radially away from the center pivot 90 in a series of 130 ft. long segments, such segments being interconnected by, referring further to FIG. 1, a matching series of water sealed pivot joints 3. Where, for example, the center pivot 90 is situated at the center of a standard 160 acre section or quarter section of agricultural land having 2,640 ft. sides, a center pivot irrigation system linking up to ten of such 130 ft. pipe sections 2 will irrigate a maximized circular area of land within such quarter section.

The distal or radially outer end of each pipe segment of such series of 130 ft. sections of overhead pipe 2 is conventionally supported by a rollable "A" frame tower comprising a circumferential leg 4, a counter-circumferential leg 6, and a horizontal crossbar 8. Radial stiffness and stability of the irrigator's "A" frame towers 4,6,8 is provided by circumferential and counter-circumferential triangulating braces 10 and 12, such braces angularly extending from each tower's lower end to a connection point upon the overhead pipe segment 2. Radially extending truss bars or cables (not depicted within views) lend vertical rigidity to the segments of pipe 2.

Electric motors 22 powered by electric supply cords 23 rotatably drive each tower's circumferential and counter-circumferential traction wheels 18 and 20, and actuations of such motors orbitally moves the center pivot system about the center pivot 90 over the ground 19. Such orbital motion over a planted field circularly distributes water carried by the overhead pipe 2, the water emitting through a radial series of sprinkler pipes or down tubes 14, and at sprinkler heads 15. Where ten of such 130 ft. lengths of overhead pipe 2 are provided, ten "A" frame towers configured similarly with the "A" frame tower depicted in FIG. 1 are preferably provided, each tower similarly supporting a radially outer end of one of the segments of the overhead pipe 2.

Each of the "A" frame towers of the instant inventive system is preferably specially equipped to include a circumferential pivot arm 24 and counter-circumferential pivot arm 26. The proximal or inner end of each circumferential pivot arm 24 is preferably pivotally mounted to a circumferential face of one of the "A" towers' circumferential legs 4 by means of a pin, eye, and clevis type hinge 28. Each counter-circumferential pivot arm 26 is preferably similarly pivotally attached to a counter-circumferential face of the "A" tower's counter-circumferential legs 6 by means of a pin, eye, and clevis hinge 30.

Figure 2:
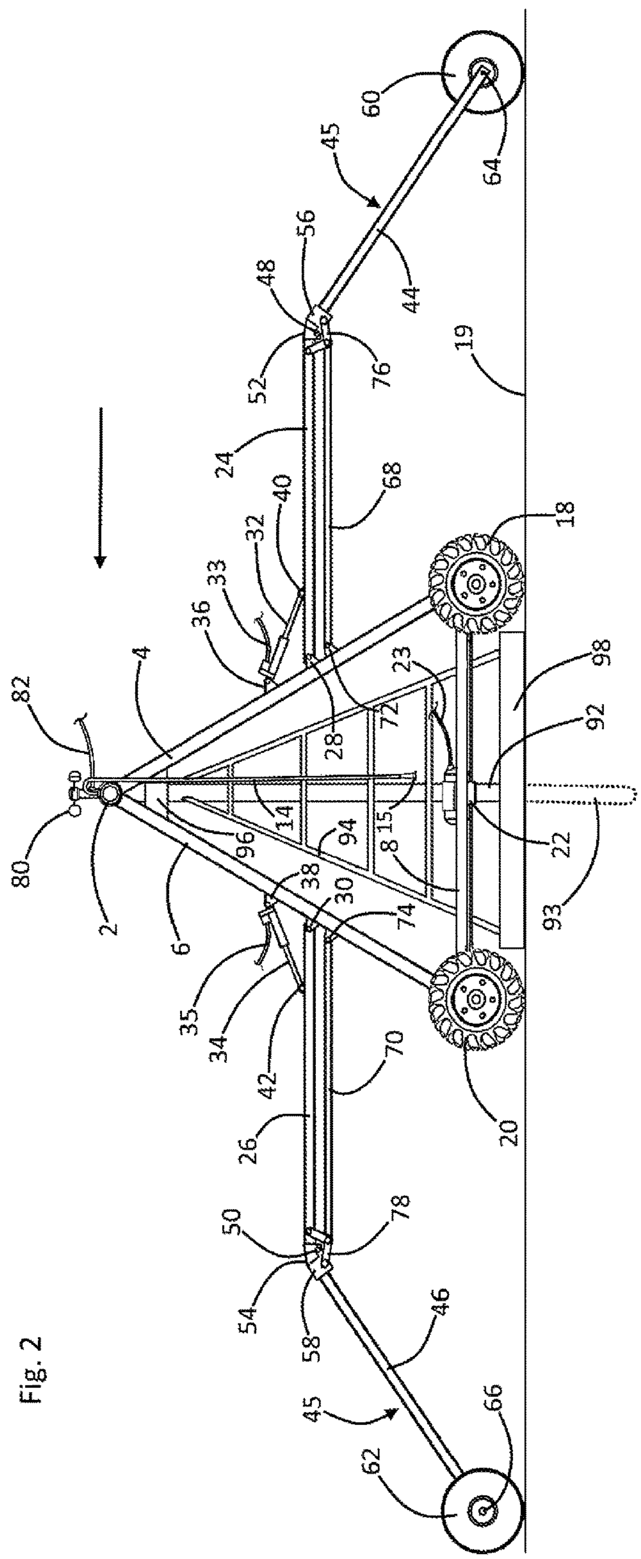
FIG. 2 is a radial end view of the tower of FIG. 1, the view of FIG. 2 showing pivot arm and extension arm components in their extended positions.

Pluralities of circumferential and counter-circumferential linear motion actuators are preferably provided, each such actuator triangulating between one of the circumferential legs 4 and its associated circumferential pivot arm 24, or between one of the counter-circumferential legs 6 and its associated counter-circumferential pivot arm 26. The linear motion actuators preferably comprise electric motor driven jack screw actuator 32,34, such actuators being powered by electric power cords 33,35. Base ends of the circumferential and counter-circumferential linear motion actuators 32 and 34 are pivotally attached to the "A" towers' circumferential and counter-circumferential legs 4 and 6 by means of clevis hinges 36 and 36. To establish triangulating pivot actuations, the opposite or distal ends of such actuators preferably extend toward a pivot arm for pivotal attachment thereto at a clevis hinge 40 or 42. Electrically switched actuations of the linear motion actuators 32 and 34 via power cords 33 and 34 may operatively extend the pivot arms 24 and 26 downwardly from their compactly raised positions depicted in FIG. 1 to their circumferentially and counter-circumferentially extended positions depicted in FIG. 2. Opposite and retracting actuations of such actuators 32 and 34 return such pivot arms to their compact and inwardly drawn positions depicted in FIG. 1. The electric motor driven jack screw actuators 32 and 34 depicted in FIGS. 1 and 2 are considered as being representative of other suitably substituted linear motion actuators such as ball screw actuators, hydraulic cylinder actuators, pneumatic cylinder actuators, and rack and pinion gear actuators, and winch actuators.

Circumferential and oppositely circumferential ground contact assemblies are preferably fixedly attached to the distal ends of the pivot arms 24 and 26, such assemblies being referred to generally by Reference Arrows 43 and 45. Each ground contact assembly comprises a ground contact member which is preferably configured as a circumferential or counter-circumferential wheel 60 or 62. The assembly's ground contact members may suitably comprise slides or skid plates, and the wheels 60 and 62 are considered as being representative of such alternative ground contact members.

In the preferred embodiment, the instant invention's ground contact assemblies further comprise circumferential and counter-circumferential extension arms 44 and 46, each extension arm proximal end being pivotally attached to a distal end of one of pivot arms 24 or 26. Such pivotal attachments preferably comprise pivot joints 48 and 50 including axles 48 and 50 which secure the proximal ends of the extension arms 44 and 46. Axles 64 and 66 preferably rotatably attach the ground contact member wheels 60 and 62 to such extension arms' distal ends.

Upon actuations of the circumferential and counter-circumferential linear motion actuators 32 and 34 to circumferentially and counter-circumferentially extend the pivot arms 24 and 26, their respectively associated extension arms 44 and 46 preferably automatically extend in the circumferential and counter-circumferential directions. During such extending motions, extension arms 44 move counter-clockwise about pivot joints 48, and extension arms 46 move clockwise about pivot joints 50. To facilitate and automatically actuate such extension arm pivoting motions, circumferential and counter-circumferential parallel bar linkages 68 and 70 are preferably provided. In the preferred embodiment, proximal ends of such parallel bar linkages are pivotally attached to the circumferential and counter-circumferential legs 4 and 6 at mounting points underlying clevis hinges 28 and 30, such pivotal mounts comprising clevis hinges 72 and 74.

As the circumferential and counter-circumferential pivot arms 24 and 26 downwardly extend, their parallel bar linkages 68 and 70 simultaneously pivot and co-extend with the pivot arms. Such co-pivoting motions of the parallel bar linkages 68 and 70 engage scissor linkages 76 and 78 to simultaneously pivot the extension arms 44 and 46 in the counter-clockwise and clockwise directions. Accordingly, actuations and counter-actuations of the linear motion actuators 32 and 34 may effectively move the pivot arms 24 and 26 and their ground contact assemblies 43 and 45 between their compact upwardly retracted positions, as depicted in FIG. 1, and their circumferentially and counter-circumferentially extended ground contacting positions, as depicted in FIG. 2.

Referring simultaneously to FIGS. 1 and 2, it may be seen that, upon full circumferential and counter-circumferential extensions of the pivot arms 24 and 26 and ground contact assemblies 43 and 45, the wheeled ground contact members 60 and 62 come into contact with and downwardly bias against the surface of the agricultural field 19. In their FIG. 2 configurations, the pivot arms 24 and 26 and ground contact assemblies 43 and 45, substantially rigidly cantilever circumferentially and counter-circumferentially from the "A" tower and function as tower stabilizing outriggers. To facilitate such cantilevering outrigger extensions, circumferential and counter-circumferential hyper-extension stops 52,56 and 50,58 are preferably integrally incorporated with pivot joints 48 and 50, such stops presenting paired lands which abut upon full outrigger extensions.

In operation of the instant inventive center pivot irrigation system, high winds blowing in the direction of the arrow drawn upon FIG. 2 at speeds in excess of 55 mph, undesirably threaten to topple or overturn one or more of the system's "A" frame towers represented by tower 4,6,8. As a result of FIG. 2's rigid cantilevering extensions of the pivot arms 26 and their ground contact assemblies 45, the bases of the "A" towers are effectively widened in the counter-circumferential direction, such widened bases resisting the wind's undesirable tower toppling effect. Upon a reversal of the wind direction, the circumferentially cantilevering pivot arms 24 and their ground contact assemblies 43 similarly prevent wind toppling in the circumferential direction.

Upon cessation of high winds, the linear motion actuators 32 and 34 may be operated to retract and raise the pivot arms 24 and 26 and their ground contact assemblies 43 and 45 upwardly and in an inwardly retracting fashion to the configurations depicted in FIG. 1. Upon such retractions, the instant inventive irrigation system preferably assumes a ground covering "footprint" which is substantially the same as or is little greater than that of a conventional center pivot irrigation system. Upon configuration of the instant inventive system in the retracted and compact configuration of FIG. 1, other mobile farm equipment and machinery may freely move around and about the system without a risk of damaging collisions with the system's stabilizing arms.

In a preferred embodiment, the above described actuations and counter-actuations of the linear motion actuators 32 and 34 are preferably controlled by microprocessor adapted switching. An electrical switching controlling microprocessor may be housed within an irrigator electronic control panel (not depicted within views) and may suitably operate the actuators 32,34 in response to pulsed wind speed data transmitted via a data cable 82 which may electronically communicate with a center pivot mounted anemometer 80. Alternatively, such microprocessor may include a radio or cellular data receiver adapted to activate actuators 32 and 34 in response to radio, cellular, or internet broadcasted wind speed warnings.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A center pivot irrigation system having a center pivot, said system being for watering crops growing upon agricultural ground, said ground having a ground surface, said system comprising:

(a) a plurality of towers which are rollable upon tower wheels, the plurality of towers being arranged in a series along a radial axis extending from the center pivot, each tower of the plurality of towers having a circumferential leg and a counter-circumferential leg, each tower wheel having a rotation axis substantially parallel to the radial axis;

(b) a plurality of circumferential pivot arms, each arm of the plurality of circumferential pivot arms having a distal end, each arm of the plurality of circumferential pivot arms having a proximal end which is pivotally attached to one of the circumferential legs;

(c) a plurality of counter-circumferential pivot arms, each arm of the plurality of counter-circumferential pivot arms having a distal end, each arm of the plurality of counter-circumferential pivot arms having a proximal end which is pivotally attached to one of the counter-circumferential legs;

(d) a plurality of circumferential linear motion actuators, each actuator of the plurality of circumferential linear motion actuators extending between one of the circumferential pivot arms and one of the circumferential legs, said each actuator being adapted for alternatively upwardly retracting and downwardly extending the one of the circumferential pivot arms;

(e) a plurality of counter-circumferential linear motion actuators, each actuator of the plurality of counter-circumferential linear motion actuators extending between one of the counter-circumferential pivot arms and one of the counter-circumferential legs, said each actuator being adapted for alternatively upwardly retracting and downwardly extending the one of the counter-circumferential pivot arms;

(f) a plurality of circumferential ground contact assemblies, each assembly of the plurality of circumferential ground contact assemblies being fixedly attached to the distal end of one of the circumferential pivot arms, said each assembly being adapted for, upon a downward extension of the one of the circumferential pivot arms, downwardly biasing against the ground surface; and (g) a plurality of counter-circumferential ground contact assemblies, each assembly of the plurality of counter-circumferential ground contact assemblies being fixedly attached to the distal end of one of the counter-circumferential pivot arms, said each assembly being adapted for, upon a downward extension of the one of the counter-circumferential pivot arms, downwardly biasing against the ground surface, wherein each circumferential ground contact assembly comprises a circumferential ground contact member, wherein each counter-circumferential ground contact assembly comprises a counter-circumferential ground contact member, wherein each circumferential ground contact member comprises a circumferential ground contact wheel, wherein each counter-circumferential ground contact member comprises a counter-circumferential wheel, wherein each circumferential ground contact wheel has a rotation axis substantially parallel to the radial axis, and wherein each counter-circumferential ground contact wheel has a rotation axis substantially parallel with the radial axis.

2. The center pivot irrigation system of claim 1 wherein each circumferential ground contact assembly comprises a circumferential extension arm having a distal end and having a pivotally attached proximal end.

3. The center pivot irrigation system of claim 2 wherein each counter-circumferential ground contact assembly comprises a counter-circumferential extension arm having a distal end and having a pivotally attached proximal end.

4. The center pivot irrigation system of claim 3 wherein each circumferential extension arm is adapted for, upon an upward retraction of one of the circumferential pivot arms, pivoting clockwise, and wherein each counter-circumferential extension arm is adapted for, upon an upward retraction of one of the counter-circumferential pivot arms, pivoting counter-clockwise.

5. The center pivot irrigation system of claim 4 wherein each circumferential extension arm is further adapted for, upon a downward extension of one of the circumferential pivot arms, pivoting counter-clockwise, and wherein each counter-circumferential extension arm is further adapted for, upon a downward extension of one of the counter-circumferential pivot arms, pivoting clockwise.

6. The center pivot irrigation system of claim 5 further comprising a plurality of circumferential hyperextension stops, each stop of the plurality of circumferential hyperextension stops being adapted for, upon a downward biasing of one of the circumferential ground contact assemblies against the agricultural ground surface, resisting a counter-clockwise pivoting motion of one of the circumferential extension arms, and comprising a plurality of oppositely-circumferential hyperextension stops, each stop of the plurality of oppositely-circumferential hyperextension stops being adapted for, upon a downward biasing of one of the counter-circumferential ground contact assemblies against the ground surface, resisting a clockwise pivoting motion of one of the counter-circumferential extension arms.

7. The center pivot irrigation system of claim 5 further comprising a plurality of circumferential bar actuators, each actuator of the plurality of circumferential bar actuators being positioned circumferentially from one of the circumferential linear motion actuators, said each circumferential bar actuator having a distal end and having a proximal end pivotally attached to one of the circumferential legs, the distal end of said each actuator being pivotally attached to one of the circumferential extension arms.

8. The center pivot irrigation system of claim 7 further comprising a plurality of counter-circumferential bar actuators, each actuator of the plurality of counter-circumferential bar actuators being positioned counter-circumferentially from one of the counter-circumferential linear motion actuators, said each counter-circumferential bar actuator having a distal end and having a proximal end pivotally attached to one of the counter-circumferential legs, the distal end of said each actuator being pivotally attached to one of the counter-circumferential extension arms.

9. The center pivot irrigation system of claim 1 wherein each actuator of the plurality of circumferential linear motion actuators and each actuator of the plurality of counter-circumferential linear motion actuators comprises an actuator which is selected from the group consisting of electric motor driven jack screw actuators, electric motor driven ball screw actuators, hydraulic rams, pneumatic rams, rack and pinion gear actuators, and winch actuators.

* * * * *